United States Patent [19]
Diaz

[11] Patent Number: 6,102,054
[45] Date of Patent: Aug. 15, 2000

[54] SCREEN AND MAT CLEANING APPARATUS

[76] Inventor: Hector L. Diaz, 1160 Cape Cod Way, Salinas, Calif. 93906

[21] Appl. No.: 09/166,352

[22] Filed: Oct. 5, 1998

[51] Int. Cl.[7] ........................................................ B08B 3/02
[52] U.S. Cl. ..................... 134/57 R; 134/58 R; 134/113; 134/137; 134/151; 134/200
[58] Field of Search ................................ 134/56 R, 57 R, 134/58 R, 113, 115 R, 137, 143, 151, 165, 200

[56] References Cited

U.S. PATENT DOCUMENTS

| | | |
|---|---|---|
| 2,174,645 | 10/1939 | Wetzel . |
| 2,290,286 | 7/1942 | Leckie et al. . |
| 3,511,252 | 5/1970 | Kennedy . |
| 3,568,691 | 3/1971 | Kennedy et al. . |
| 3,656,493 | 4/1972 | Black et al. . |
| 4,126,485 | 11/1978 | Sadwith . |
| 4,170,240 | 10/1979 | Gentry . |
| 4,744,379 | 5/1988 | Goettel . |
| 5,056,948 | 10/1991 | Puder et al. . |
| 5,614,031 | 3/1997 | Cushing . |
| 5,769,956 | 6/1998 | Cord et al. . |
| 5,771,909 | 6/1998 | Hein et al. . |

*Primary Examiner*—Frankie L. Stinson
*Attorney, Agent, or Firm*—Patrick T. Reilly

[57] ABSTRACT

An apparatus is provided to efficiently clean a mat or a screen. The screen or mat is placed on or within a frame and within an enclosure; large volumes of pressurized water and/or cleaning solvent are simultaneously directed towards one or more sides of the screen or mat. Temperature sensors in combination with a heating element and ph detectors are controlled by a pre-programmed system controller to insure that the temperature of the water is maintained within a specified range and that the water recycled within the apparatus is within an acceptable limit of contamination. A preferred design of the apparatus includes a mobile frame that is moved to the initial location of the mat and then returned to the enclosure while bearing the mat. The mobile frame reduces a risk of injury to cleaning personnel. A truck may be configured to carry one or more apparatus from site to site to allow customer based site cleaning opportunities.

19 Claims, 6 Drawing Sheets

SCREEN AND MAT CLEANING APPARATUS

BACKGROUND OF THE INVENTION

1. Field of the Invention

The present invention relates to devices, tools and methods used to clean mats and screens. More particularly, the present invention relates to automated machines used to sanitize industrial and restaurant mats and various screens to include air filter screens.

2. Description of Related Art

Several major industries currently rely upon mats and filters to improve the sanitary conditions of the workplace and to enhance the working environment for workers. Floor mats are used in food service, manufacturing and health care settings to reduce leg and lower back strain, decrease the incidence of injuries due to slipping and fatigue, limit biological and chemical contamination and pest infestation.

Air filters are used to improve the air quality of residences and work areas, and to reduce biological and/or chemical contamination and cross-contamination in houses, apartment buildings, factories hospitals, clinics, hotels, restaurants and numerous other locations.

Conventional equipment and techniques used to clean mats and filters include the awkward manual manipulation of a mat or filter and the use of a hand held spraying nozzle. The conventional mat cleaning techniques are especially wasteful of water and time consuming.

The manipulation of often heavy mats in prior art is unacceptably prone to generate back strain in workers. Furthermore, cross-contamination is even more likely to occur, where chemical agent and organisms originally located on a mat or filter are splashed or rubbed onto a worker's clothing, wherefrom the worker proceeds to promptly transfer the collected agents and particulates to a food handling, medical or other work area.

The worker's safety is additionally imperiled by repeated exposure to chemical cleaning agents intentionally used in the conventional cleaning process. An inappropriate risk of worker injuries, due to accidental slipping and falling while handling and spray cleaning mats and filters, is also evident in most contemporary mat and filter cleaning operations.

The realities of industrial mat cleaning practices include illegal and/or unacceptable actions, such as placing mats and screens into industrial dish washers. The inappropriate use of these dishwashers to clean mats and screens leads to worker lifting injuries, damage to the washing machines from jamming and the unintentional sponsorship of bacterial growth in the mats and screens. This bacterial growth is encouraged by the hot and humid internal environment of most industrial dish washing machines.

The illegal use of car washing facilities to wash mats and filters typically allows the release of volumes of grease and other contaminants into the water supply and the proximate ecology. Pedestrian pathways, sidewalks, driveways and parking lots are routinely polluted by such illegal activities on a routine basis today.

The benefits of hygienically clean mats and filters are well known and fully documented. The limitations of prior art cleaning equipment and techniques have unfortunately inhibited the efficiency with which mats and screens may be properly cleansed, and in some cases conventional practices actually degrade the sanitary quality of a work place, public area or dwelling.

There is, therefore, a long felt need in various public, domestic and industrial settings to provide an apparatus that reliably and easily cleans mats, screens and air filter screens.

OBJECTS OF THE INVENTION

It is therefore an object of the present invention to provide an apparatus that will effectively and efficiently clean a mat or an air filter.

It is another object of the present invention to provide an apparatus that recycles water while cleaning mats and air filters and thereby conserves water.

It is an additional object of the present invention to provide an apparatus that in application improves the sanitation of industrial, food handling, food preparation and kitchen work places.

It is a further object of the present invention to provide an apparatus that reduces the number of labor hours required to clean a mat or an air filter.

It is still another object of the present invention to provide an apparatus that reduces the frequency and severity of cross-contamination caused by worker contact with a mat or an air filter during the cleaning process.

It is yet a further object of the present invention to provide an apparatus that increases the consistency of the degree of cleanliness of a mat or an air filter resulting from each executed cleaning cycle.

SUMMARY OF THE INVENTION

The present invention provides an apparatus for cleaning mats, air filter screens and other screens. The preferred embodiment includes a frame contained within an enclosure. A mat or screen is placed onto the frame and within the enclosure. A door of the enclosure is first opened to allow the insertion of a screen or mat and then closed to enclose the screen or mat during the a washing cycle. A water delivery network is housed within the enclosure and is positioned about the screen or mat. Water or a water based cleaning solution, or other suitable cleaning agents known in the art, are then forced out of the water delivery network and against the screen or mat.

Certain alternate preferred embodiments include additional equipment to recycle the cleaning agent, to maintain the temperature of the cleaning agent within a prespecified range and/or to maintain the contamination of the cleaning agent within a prespecified range of ph levels.

Still other certain alternative preferred embodiments of the present invention comprise a slidable mat frame that may be moved in and out of the enclosure and thereby allows easier manual placement of the screen or mat onto, or into, the mat frame.

Additional alternate preferred embodiments of the present invention include a positioning of one or a plurality of mat cleaning apparatuses in a truck or other mobile vehicle, whereby the vehicle provides efficient mat cleaning operations in multiple locations in a serial basis.

A screen rack is used in certain still other preferred embodiments of the present invention to more effectively contain or hold a screen or air filter within the enclosure during the washing cycle.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE PREFERRED EMBODIMENTS

Figure 1:
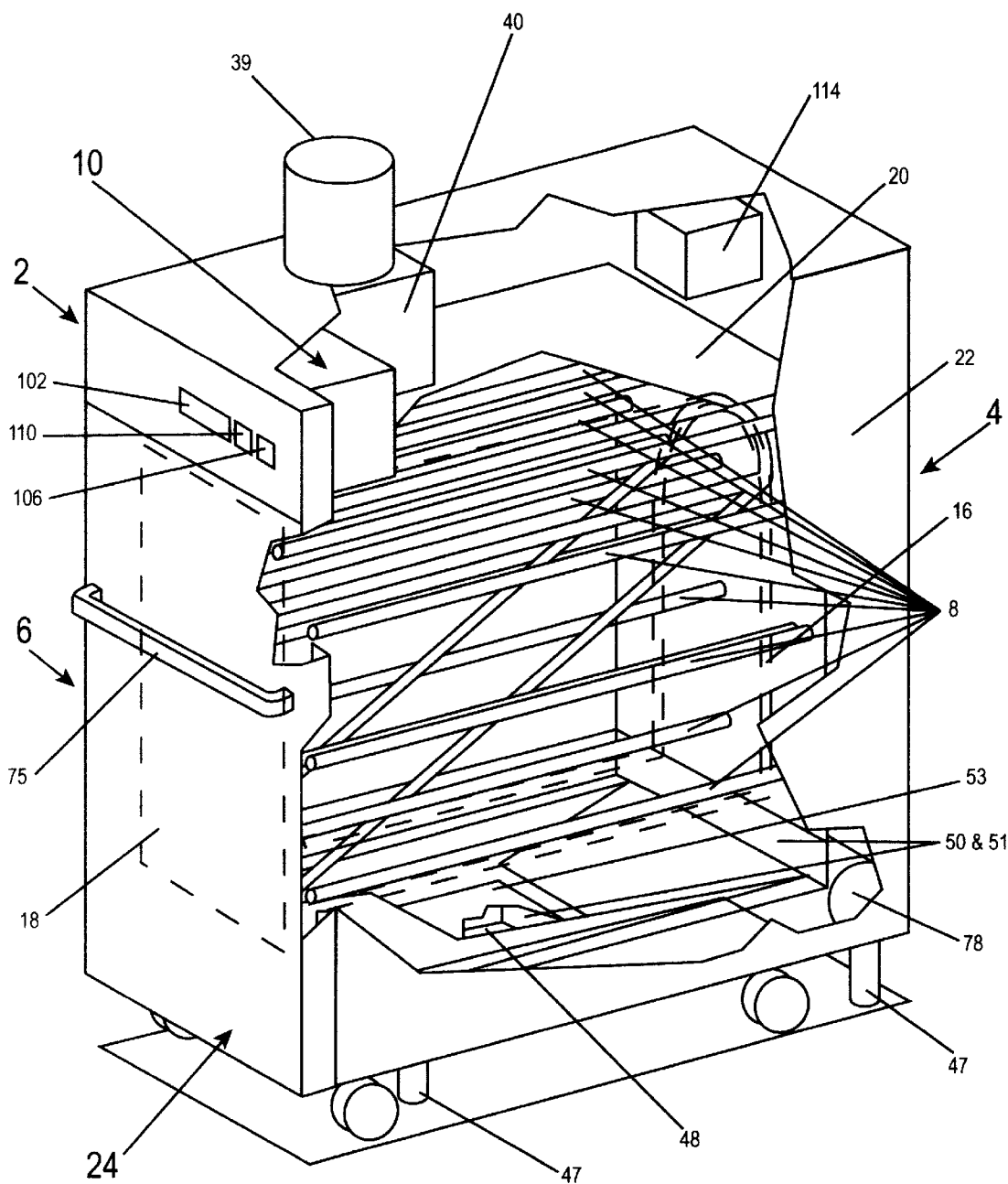
FIG. 1 is an isometric and cut-away view of a preferred embodiment of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

It is understood that the term screen is defined within this document to describe a rigid or semi-rigid screen, air filter or air filter screen. It further understand that the term water stream is defined as a liquid volume optionally comprising water, solid, liquid or gaseous detritus and/or contamination, disinfectant(s), degreasing agent(s), detergent(s) and/or other suitable cleaning agent(s) known in the art. The terms tubing, tube and water tube are defined as one or more hollow physical element or elements that may contain a volume of liquid and allow a volume of liquid to pass through without obstruction, unless specifically noted, along at least one axis. A channel is defined as a tube that contains an open end, a stoppage and one or more release slots, open slots, holes or apertures through which water or liquid that enters through the open end and inside of the channel may escape out of the channel. Tubing, tubes and channels used in the present invention are formed of rubber, plastic or metal, or other suitable materials known in the art.

Referring now to FIGS. 1, 2, 3 and 6 a preferred embodiment of the present invention, a mat cleaning system 2, comprises an enclosure 4, a mat frame 6, a water flow or water delivery network 8 and an electro-mechanical control system 10. Said water flow network 8 receives a pressurized water stream 12 from a pressurized water source 14.

In operation of said cleaning system 2, a mat 16 is draped about said mat frame 6. Said mat frame 6 holds said mat 16 within said enclosure 4 during a washing cycle. Said control system 10 then permits said water stream 12 to flow through said water flow network 8 and against said mat 16, as is further explained in detail below.

Said enclosure 4 includes an enclosure aperture 18, a cleaning shell 20, an instrument compartment 22 and a sump assembly, or sump 24. Said mat 16 is placed within said cleaning shell 20 and on said mat frame 6 during the washing cycle.

Said water flow network 8 includes a hose connector 26, an input tube 28, a back flow check valve 30, a first and a second delivery tube 32A & 32B, an inner channel 34, a set of outer channels 36A & 36B, an output drainage tube 38, a detergent supply 39, a detergent dispenser 40, a first and a second recycling tubes 41A & 41B, an overflow tube 42 and a drain 44. Said water stream 12 enters into said water flow network 8 via said input tube 28 and under a positive pressure from said water source 14. Said input tube 28 passes through said aperture enclosure 18 and into said enclosure 4. Said inner and outer channels 34, 36A & 36B are pierced by a plurality or multiplicity of release slots 46, wherefrom said water stream 12 exits under a positive pressure from said channels 34, 36A & 36B and against said mat 16. Said inner and outer channels 34, 36A & 36B are stoppered so that said water stream 12 is directed under pressure into channels 34, 36A & 36B if finite volume and length whereby the flow path a said water stream 12 is redirected to pass out of said release slots 46. Said release slots 46 may be subsatantively circular, orthogonal, elliptical, oval formed in other suitable shapes known in the art. Said release slots may be sized as circles of one half to three millimeters in diameter or other suitable sizes known in the art.

Said back flow check valve 30 prohibits a flow of said water stream 12 from the invented system 2 and into said water source 14.

Said dispenser 40 releases portions of said detergent supply 39 into said water stream 12 as said water stream 12 is recycled through said first recycling tube 41A. The water recycling functions of said cleaning system 2 are further discussed below.

Referring now to FIGS. 1, 2, 3 and 5, said sump assembly 24 includes a set of four sump legs 47, a bottom sump panel 48, a wall length 50, a sump volume 51, a drain feed hole 52, a sump flow filter screen 53, a sump overflow aperture 54 and a sump recycle port 55. Said bottom sump panel 48 lies substantively in a horizontal plane. Said wall length 50 rises substantively vertical from said bottom sump panel 48 and together with said sump panel 48 defines and encloses a sump volume 51 above said bottom sump panel 48 whereby said sump volume 51 may hold and contain a limited volume of said water stream 12. Said water stream 12 may exit from said sump assembly 24 via said drain feed hole 52, said sump overflow aperture 54 and said recycle port 55. Said sump overflow aperture 54 and said recycle port 55 are located in said sump wall length 50. Said overflow aperture 54 allows water stream 12 to immediately pass through said overflow tube 42 and into drainage tube 38 when said water stream 12 pools up within said sump 24 above a predetermined volume.

Said sump flow filter screen 53 lies within said sump volume 51 and is positioned to filter said water stream 12 prior to said water stream 12 entering into said drain feed hole 52, said overflow aperture 54 and/or said recycle port 55.

Said first recycling tube 41A is connected to said recycle port 55 and receives portions of said water stream 12 from said sump volume 51 through said sump filter screen 53 and said recycle port 55.

Said overflow tube 42 is connected to said sump overflow aperture 54 and allows the flow of water stream 12 from said sump volume 51 into said output drainage tube 38.

Said output drainage tube 38 is connected to said drain feed hole 52. Said drain feed hole 52 is located in said bottom sump panel 48 and allows said water stream 12 to flow under the influence of gravity away from said sump assembly 24 towards said drain 44 when an output drain solenoid valve 76B is in an open state. Said sump flow filter screen 53 protects said drain feed hole 52, said output drainage tube 38 and said drain 44 from clogging by prohibiting the flow of undesirably large elements of a detritus 58 or a contamination 60 through said drain feed hole. Said sump flow filter screen 53 protects said sump overflow aperture 54, said output drainage tube 38, said overflow tube 42 and said drain 44 from clogging by prohibiting the flow of undesirably large elements of a detritus 58 or a contamination 60 through said sump overflow aperture 54. Said sump flow filter screen 53 protects said first recycling tube 41A from clogging by prohibiting the flow of undesirably large elements of said detritus 58 or said contamination 60 through said overflow aperture 54.

Figure 2:
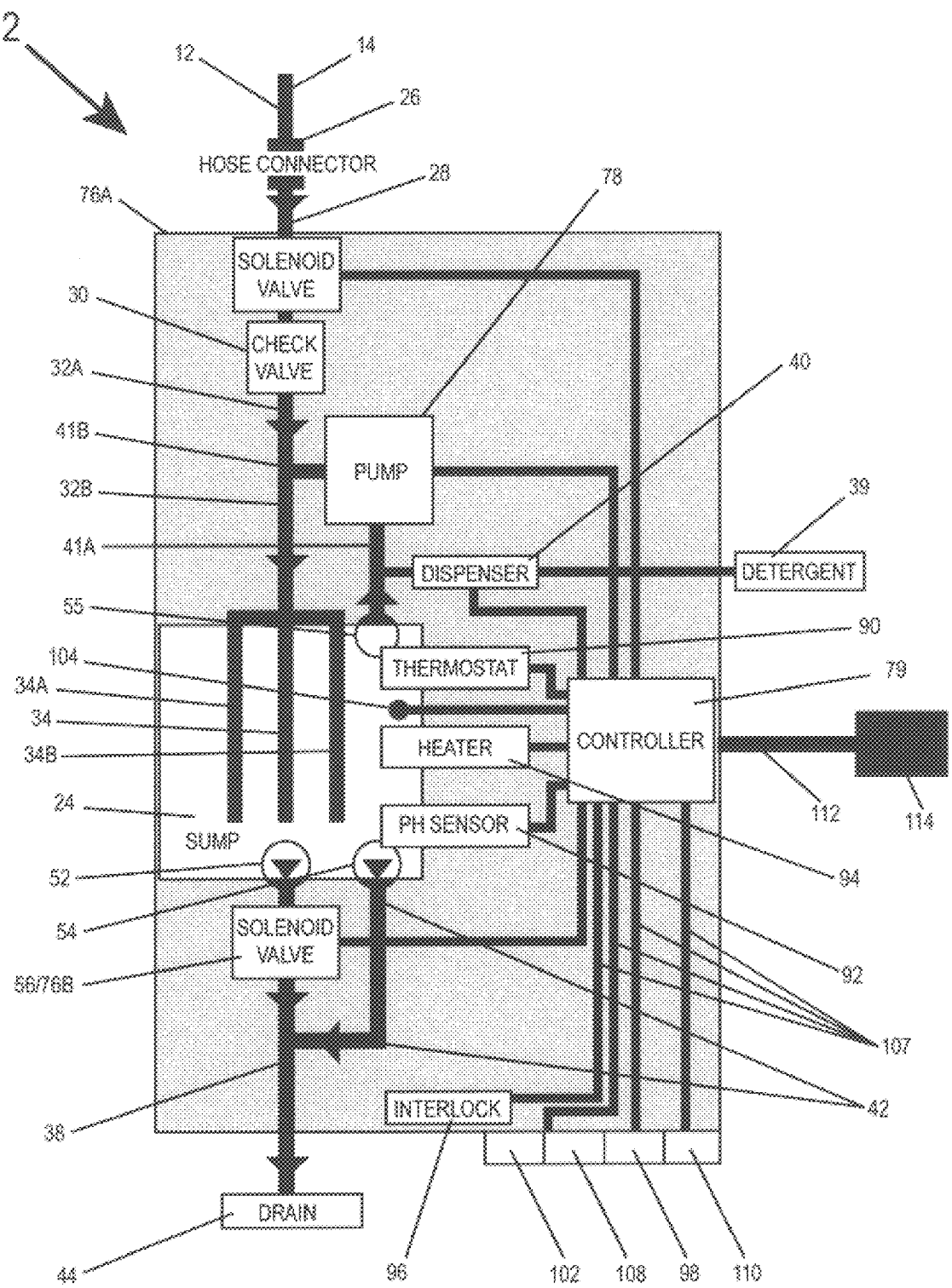
FIG. 2 is a schematic diagram of the water flow network and electronic control system of the mat cleaning system of FIG. 1.
Figure 6:
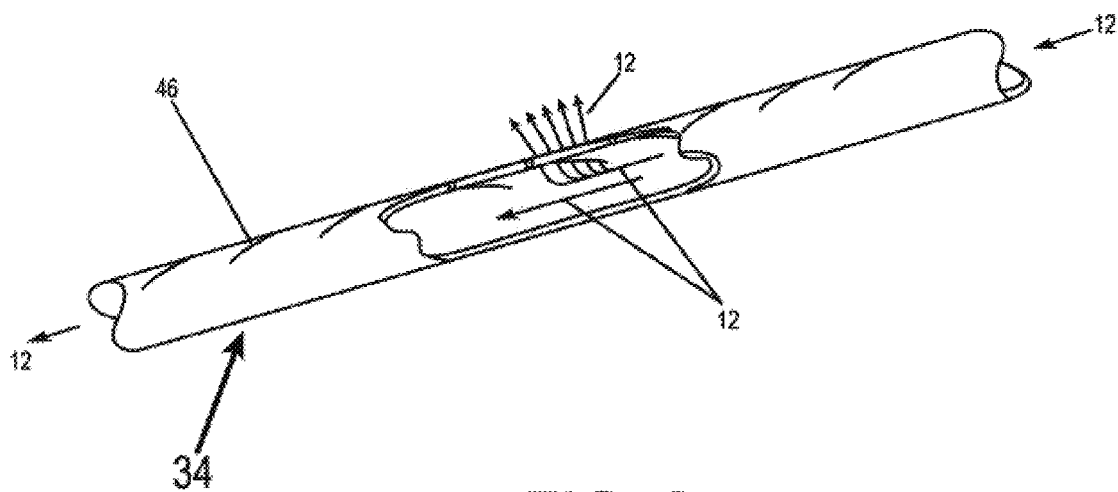
FIG. 6 is a cut-away view of a channel of the mat washing system of FIG. 1.

Referring now generally to the FIGS, and more particularly to FIGS. 2 and 6, said mat frame 6 holds said mat 16 in a substantively static position and where said mat 16 may be struck by said water stream 12 as said water stream 12 exits from slots 46 of said outer and inner channels 34, 36A & 36B of said water flow network 8 inside of said shell 20. In the operation of said mat cleaning system 2, said mat 16 is draped over a top beam 62 and about a pair of side beams 64A & 64B of said mat frame 6, whereby said mat 16 is positioned to be struck by said water stream 12 after said water stream exits 12 from said plurality or a multiplicity of release slots 46 of said inner and outer channels 34, 36A & 36B of said water flow network 8. Said water stream 12 thus acts to remove said detritus 58 and said contamination 60 from said mat 16 and carries said detritus 58 and said contamination 60 from said mat 16 and into said sump assembly 24.

Said enclosure 4, said mat frame 6 and said water flow network 8 may be variously made of metal, metal alloy, plastic, composite materials or other suitable materials, separately and/or in combination, as known in the art.

Said overflow aperture 54 of said sump 24 is located in said wall length 50 and above said bottom sump panel 48. Said overflow tube 38 is connected to said overflow aperture 54 and allows said water stream 12 to flow out of said sump assembly 24 through said overflow drainage tube 42 and into said output drainage tube 38. Please note that said overflow drainage tube 42 bypasses said output drain solenoid valve 76B and that said water steam 12 is therefor free to flow out of said drain 44 irrespective of the instantaneous closed or open state of said output drain solenoid valve 48.

Figure 3:
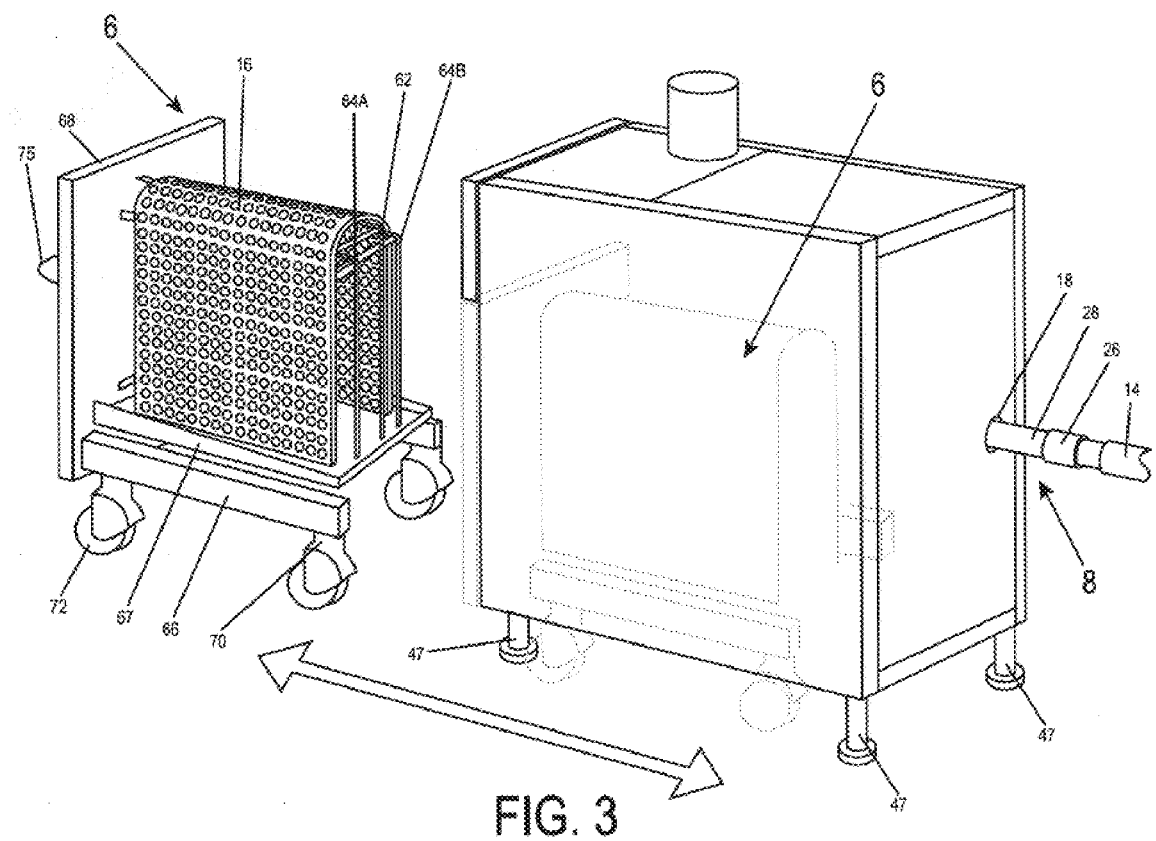
FIG. 3 is a view of the mat frame and enclosure of the mat washing system of FIG. 1.

Referring now to FIGS. 1, 2 and 3, said mat frame 6 includes a base frame 66, a drip pan 67, a door 68, four wheel modules 70 with individual wheels 72, a vertical member assembly 74, a handle bar 75, said top beam 62 and said pair of side beams 64A & 64B. Said wheels 72 may be solid or inflated, are made of rubber, plastic or other suitable materials known in the art, and are individually and replaceably mounted within said wheel modules 70 and are thereby positioned to facilitate the manual movement of said mat frame 6 within a substantively horizontal plane. Said wheel modules 70 are semi-permanently attached to said base frame 66. Said wheel modules 70 and said wheels 72 enable said mat frame 6 to be easily removed out of and away from said enclosure 4 whereby said mat frame 6 may be rolled towards said mat 16. This easy mobility of said mat frame 6 allows the invented system 2 to enable safer and more convenient manual placement of said mat 16 onto said mat frame 6, and to provide for safer transport of said mat to and from a working location and said invented system 2. Said handle bar 75 is substantively rigidly attached to said door 68 and improves the ease with which said mat frame 6 may be moved by an industrial laborer, a kitchen worker or other user.

Said vertical member assembly 74 is substantively rigidly attached to said base frame 66. Said top beam 62 and said pair of side beams 64A & 64B are substantively rigidly attached to said vertical frame 74 in positions that allow for the placement of said mat 16 in a position about said top beam 62 and said pair of side beams 64A & 64B that allows said water flow network 8 to effectively direct said water stream 12 from said inner channel 34 and said set of outer channels 36A & 36B and against said mat 16 for a thorough cleaning.

Figure 4:
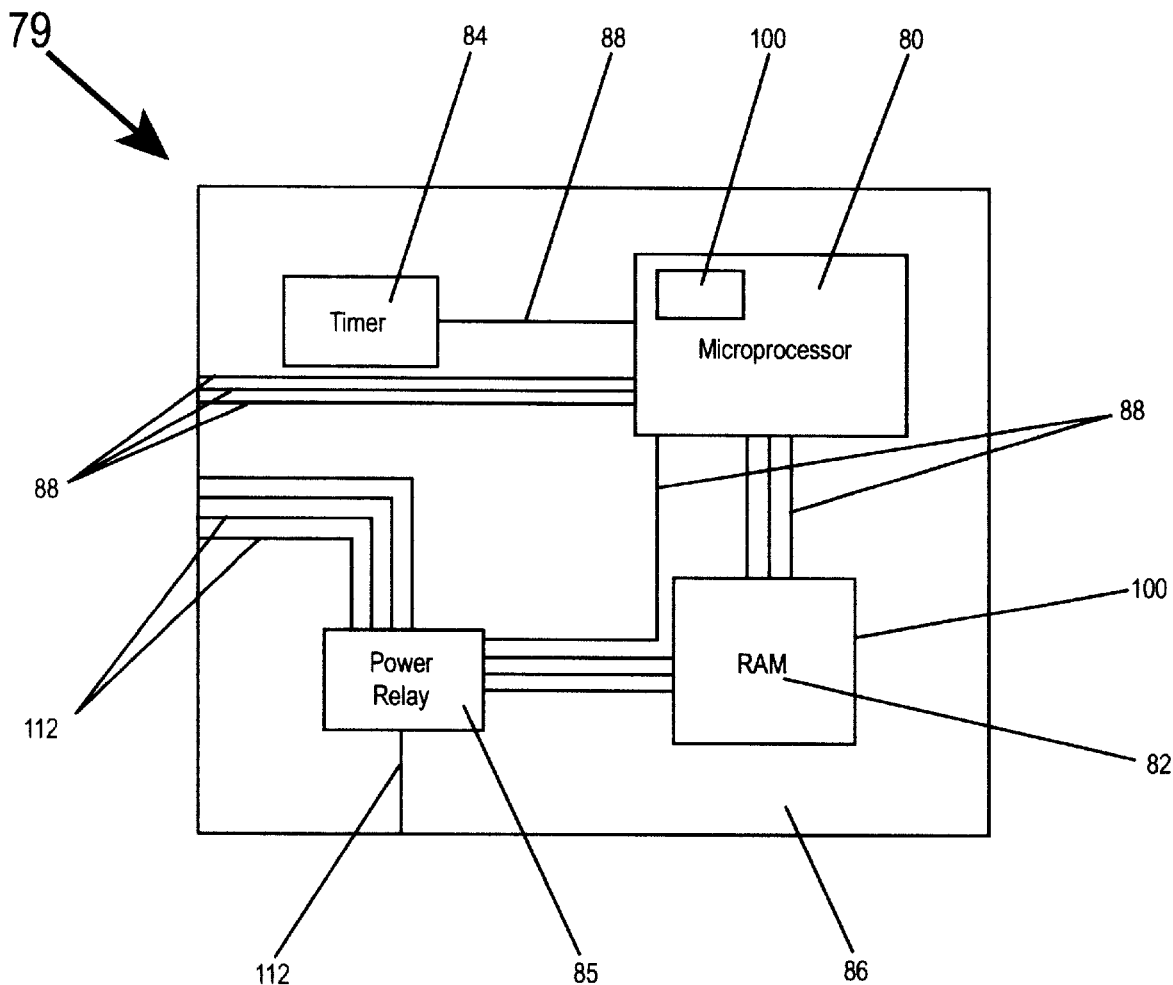
FIG. 4 is a schematic of the controller of the mat washing system of FIG. 1.
Figure 5:
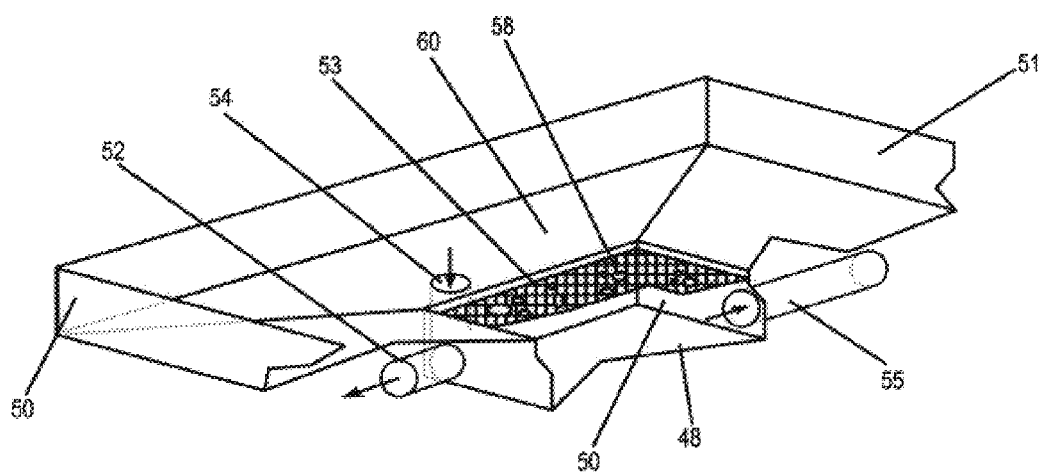
FIG. 5 is a view of the sump assembly of the mat washing system of FIG. 1.

Referring now generally to the FIGS, and particularly to FIGS. 2 and 4, said electro-mechanical control system 10, or control system 10, monitors the state of the water stream 12 as said water stream 12 collects in said sump 24 and controls the flow of said water stream 12 through said invented system 2 by means of an input solenoid valve 76A and a drain solenoid valve 76B, a pump 78 and a controller 79. Said controller 79 comprises a digital microprocessor 80, a digital system memory device 82, or system memory 82, a clock or timer 84, power relays switching device 85 and a printed circuit board 86. A network of metallic traces 88 provide signal pathways within the controller 79 and among said components 80, 82 & 84 of said controller 79 and further provide input and output signal pathways from said components 80, 82 & 84 to other elements of said invented system 2, such as said ph sensor 92, said thermostat or temperature sensor 90 and said pump 78. Said pair of solenoid valves 76A & 76B are separately and independently controlled by an operator so that the command of said controller 79 may be overridden, whereby the operator may turn on and turn off either valve 76A & 76B as the operator best judges. This manual capability is included primarily as a safety feature.

Said digital microprocessor 80 may include or consist of a Motorola 68000 microprocessor or another suitable microprocessor micro controller or controller known in the art. Said digital memory 82 may be a dynamic RAM or a static RAM or one or more other suitable memory devices known in the art. Said clock or timer 84 may be a discrete device, a crystal clock or an other suitable clock or timer known in the art.

Said microprocessor 80 receives parametric data about said water stream 12 from a thermostat 90 and a ph sensor 92. The electrical signals transmitted from said thermostat 90 inform said microprocessor 80 as to the instantaneous temperature of the portion of said water stream 12 that has collected in said sump 24. Similarly, electrical signals transmitted from said ph sensor 92 inform said microprocessor about the instantaneous ph level of the portion of the water stream 12 that has collected in said sump 24.

Said microprocessor 80 affects the flow and the ph and temperature state of said water stream 12 through said invented system 2 by means of individually manipulating the operating states of said solenoids 76A & 76B, said pump 78, an adjustable heating element or heater 94, and said detergent dispenser 40.

An operator of said invented system 2 typically initiates a cleaning action by manually removing said mat frame 6 out of and a way from said enclosure 4, The operator then places said mat 16 on top of said top beam 62 and about said pair of side beams 64A & 64B of said mat frame 6. The operator then manually wheels said mat frame 6 fully back into said enclosure 4, whereby said door 68 is tightly sealed against said enclosure 4 and an electrical interlock sensor or proximity sensor 96 informs said microprocessor 80 that said mat frame 6 is properly placed within enclosure 4 to allow a washing cycle to commence. The operator then manually depress a start button 98, whereby said start button 98 signals said microprocessor 80 to initiate the washing cycle.

Said microprocessor 80 controls the operation of said invented system in accordance with a set of instructions contained in a software program 100 that is stored in said system memory 82. Said microprocessor 80 first confirms that said interlock sensor 96 that said door 68 is sufficiently in contact with said enclosure 4 to permit a washing cycle. If this is not confirmed, said digital processor transmits an error message to a display device 102, whereby the operator is informed that said mat frame 6 is not properly positioned within said enclosure 4. When a positive signal is received by said microprocessor 80 from said interlock sensor 96, said microprocessor 80 then signals said input solenoid valve 76A to transition from a closed state, whereby said water stream 12 is prohibited from passing through said water flow network 8, to an open state whereby said water stream 12 passes under a positive pressure from said water source 14 sequentially through said hose connector 26, said input tube 28, said back flow check valve 30, said solenoid valve 76A, said delivery tubes 32A & 32B, said inner channel 34 and said outer channels 36A & 36B. Said water stream 12 then passes out of said release slots 46 of said channels 34, 36A & 36B and is substantively directed towards said mat 16. Said water stream 12 then drips and flows downwards and towards said sump 24.

Said invented system 2 is designed to recycle water stream 12 for the purpose of water conservation. To this end, said microprocessor 80 sets said drain solenoid valve 76B to a closed state, whereby water stream 12 collects in a pool within said sump volume 51. A level sensor 104 informs said microprocessor 80 when a sufficient volume of said water stream 12 is held within said sump assembly 24 that pump 78 may be turned on. After receiving a positive signal from said level sensor 104, said microprocessor 80 checks said ph sensor 92 to determine if an instantaneous reading of said water stream 12 indicates that said water stream is too contaminated for recycling. Should the ph reading indicate that said water stream 12, as pooled in said sump 24, is too contaminated for recycling, said microprocessor 80 signals said drain solenoid valve 76B to open and thereby allow said water stream 12 to exit the invented system via said output drainage tube 38 said drain 44.

Where said level sensor 104 and said ph sensor 92 indicates that a sufficient amount of acceptably clean water stream 12 is contained within said sump 24, said microprocessor 80 turns on said pump 78, whereby said water steam 12 is transferred out of said sump 24, through said recycling tubes 41A & 41B and back into said second delivery tube 32B. At this point the invented system is successfully recycling water through said water flow network 8.

Said microprocessor 80 further monitors the instantaneous temperature of the portion of said water stream 12 which is pooled within said sump 24 by means of reading the data transmitted from said thermostat 90. When the temperature data generated by said thermostat 90 indicates that said water stream 12 is colder than a prespecified level, said microprocessor 80 signals said heater 94 to deliver heat into said water stream 12. Said power relays switching device 85 individually controls, i.e. enables or disables, as directed by said microprocessor 80 and thereby allows said microprocessor 80 to individually and separately enable and disable electrical power delivery to said pump 78, said heater 94, said solenoid valves 76A & 76B, said display 102 and said detergent dispenser 40.

Please note that the term detergent is defined herein to include any suitable detergent, cleaning, washing, disinfecting or degreasing agent or agents known in the art, singularly or in mixture or in combination. In certain preferred embodiments of the present invention a plurality of detergent dispensers 40 are configured and employed to release a variety of detergents into said water stream 12. The microprocessor 80 may be employed to release combinations of detergents in relationship to the ph level detected by said ph sensor 92.

An electrical signal network 107 provides signal paths to and from said controller 79 and said interlock sensor 96, an input/output port 108, or I/O port 108, said start button 98, an emergency stop or off button 110, said ph sensor 92, said heater 94, said thermostat 90, said level sensor 104, said detergent dispenser 40, said pump 78 and said solenoid valves 76A & 76B. An electrical power network 112 provides electrical power from an electrical power source 114, through said power relays switching device 85, and to said micro controller 80, said system memory 82, said clock or timer 84, said interlock sensor 96, said input/output port 108, said start button 98, said emergency off button 110, said ph sensor 92, said heater 94, said thermostat 90, said detergent dispenser 40, said pump 78 and said solenoid valves 76A & 76B.

Said clock 84 is used by microprocessor 80 to determine the time elapsed during the washing cycle. said emergency off button 10 is used by the operator to inform the microprocessor 80 to shut down the washing cycle by closing said input solenoid valve 76A, opening said drain solenoid valve 76B, turning off said detergent dispenser 40, said pump 78 and said heater 94, thereby effectively turning off said invented system 2.

In a typical operation said microprocessor 80 allows said mat 16 to be washed for a predetermined time period, adds detergent to said water stream 12 by means of said detergent dispenser 40 and heats said water stream 12 by means of said heater 94. Said microprocessor 80 monitors the passage of time by reading the output and/or states of said controller clock 84. At the end of the predetermined and preprogrammed washing time period, said microprocessor 80 closes said first solenoid valve 76A, opens said second solenoid valve 76B, turns off said detergent dispenser 40, said pump 78 and said heater 94, and thereby returns said invented system 2 to an off state.

The shell 20 of the invented system 2 may be of orthogonal construction and measure 53 inches in height, 30 inches in width and 48 inches in depth. Depth is defined along an axis running perpendicularly from said door 60, where said mat frame 6 is full inserted into said shell 20, and towards said enclosure aperture 18. The mat frame 6 fits within these dimensions of said shell 20, and may be 50 inches in maximum height and 44 inches in length. The channels 34, 36A & 36B are best designed to extend in length beyond the mat frame 6, to a maximum length allowed by the internal dimensions of said shell 20 in order to efficiently clean a surface area of said mat 16. Said set of sump legs 47A, 47B, 47C & 47D are positioned to provide stability to said enclosure 4 and to allow mobility for said mat frame 6.

Said instrument compartment 22 is semi-permanently attached to and above said shell 20 and may measure 8 inches in height, 30 inches in width and 48 inches in depth. Said compartment 22 houses and protects said controller 79, said detergent dispenser 40, said display 102, said I/O port 108, said start button 98 and said emergency off button 110. Said detergent supply 39 is positioned above and lies upon said compartment 22.

Said I/O port 108 provides a means to electrically connect said controller 79 to an external controller, not shown, whereby the operation of said invented system may be monitored and/or directed by said external controller. In certain alternate preferred embodiments of the present invention a plurality of said mat cleaning system 2 are removably located on a motorized truck or other self-propelled vehicle whereby simultaneous cleaning of a plurality of mats or screens may be accomplished.

Figure 7:
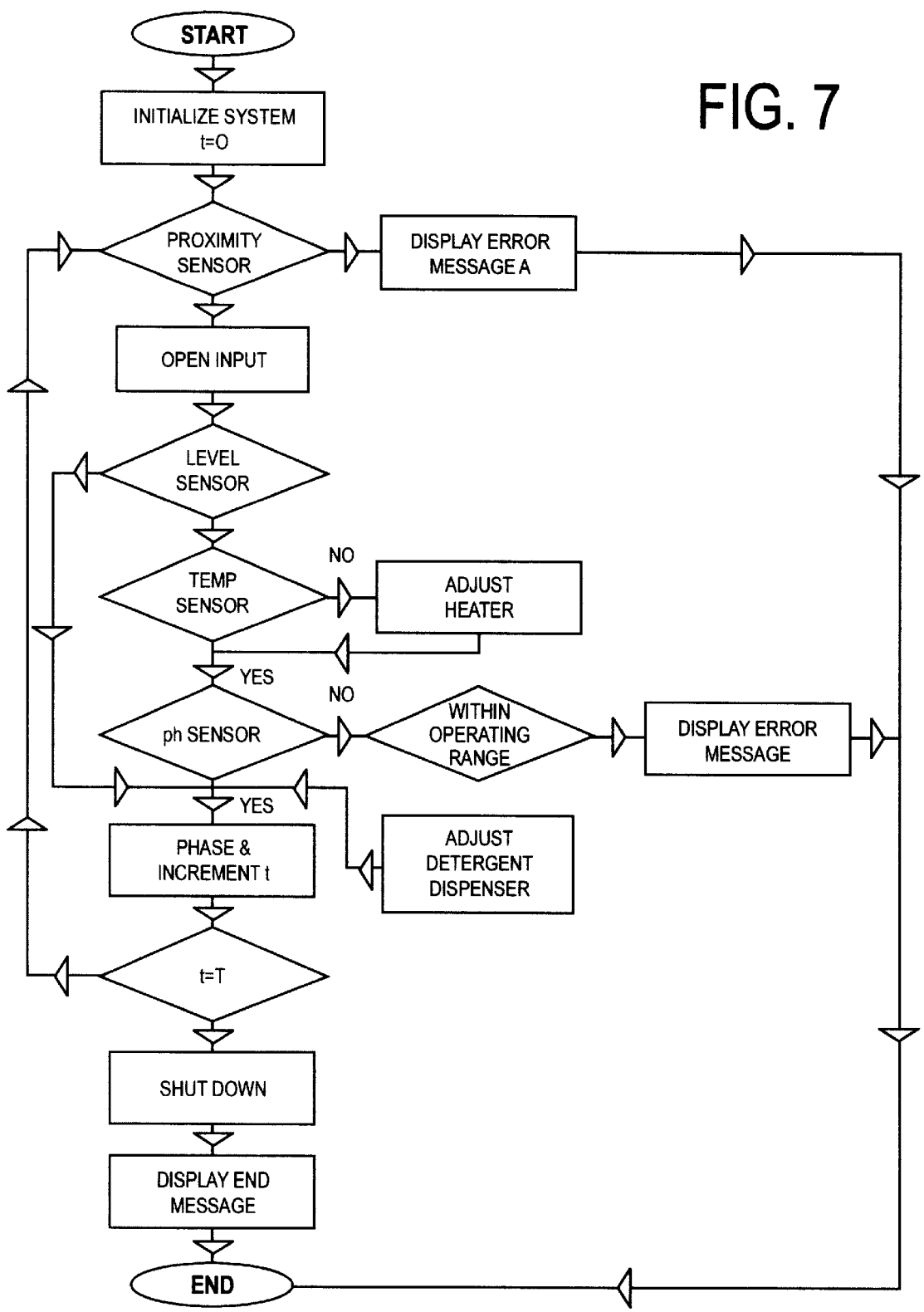
FIG. 7 is a logic flow chart of the system software of the mat washing system of FIG. 1.

Referring now to the FIGS. and particularly FIG. 7, a software flow chart of the operating schema of said software program 100 directs that said controller receives a start command by means of the depression or enablement of said start button 98, whereafter said microprocessor 80 initializes a variable t to a zero value and said system 2 is initialized wherein said input valve 76A is closed, said drain valve 76B is opened, said heater 94 and pump 78 are turned off and said detergent dispenser 40 is primed. Said proximity sensor 96 is then polled to determine if said mat frame 6 is fully seated within said enclosure 4. If said proximity sensor 96 communicates that said mat frame 6 is not properly placed within said enclosure 4, an error message A is transmitted to and displayed by said display 102, and said system 2 is shut down. If said proximity sensor 96 indicates that said mat frame 6 is properly seated within said enclosure 4, said input valve 76A is opened and said water stream 12 is allowed to flow under pressure from said pressurized water source 14 and through said water flow network 8.

Said level sensor 104 is then polled to determine if said water stream 12 has pooled in sufficient quantities within said sump assembly 24 for said temperature sensor 90 and said ph sensor 92 to take an accurate reading. If not, said controller 79 simply increments the t value and said system 2 proceeds onwards.

Where said water stream 12 has collected in a sufficient quantity in said sump assembly 24 to enable said level sensor 104 to provide a positive reading, said temperature sensor 90 is polled to determine if the temperature of said water stream 12 is within an temperature acceptable range. If said water stream 12 is outside of the acceptable temperature range, said heater 94 is turned on, turned off or otherwise adjusted to modify the temperature of said water stream 12. Said ph sensor 92 is next polled to determine if the ph of said water stream 12 is within a ph desired range. If the ph is not, the ph value is then checked to see if the ph of said water stream 12 is so radical as to lie outside of a wider operating range. A condition of the ph to be so extremely outside of the desired range is most likely caused by over contamination of said water stream 12 by detritus 58 and contamination 60, in which case said system 2 is shutdown, i.e. said drain valve 76B is opened, said input valve 76A is closed and said heater 94 and said detergent dispenser 40 are turned off. An error message B then informs the operator via said display 102 that said water stream 12 is contaminated beyond an acceptable level.

Said detritus 58 and said contamination 60 are then removed by flushing said system 2, under the control of an operator, through said water flow network 8 and/or by manual cleaning by the operator.

Where said ph is outside of the desired range but within the operating range, the insertion of said detergent 39 via said detergent dispenser 40 is adjusted to modify the ph of said water stream 12 towards the desired ph range. The value t is then incremented. If t has increased sufficiently to be equal to a constant value T, the cleaning cycle is complete and said controller 79 shuts down said system 2 by closing said input valve 76A, turning off said heater 94 and said detergent dispenser 40 and opening said drain valve 76B. An end message is then displayed on said display 102 and said system 2 waits for further instructions from the operator.

Where the value t has not been incremented to equal the value of T, said controller 79 repeats the process series of checking polling said proximity sensor 96, said level sensor 104, said temperature sensor 90 and said ph sensor 92, and acting in accordance with the above described operating schema on the basis of the states of said sensors 90, 92, 96 & 104.

Please note the operator may at anytime enable said emergency stop button 110 to transmit an emergency stop command to said controller 79 as an interrupt message, whereafter said controller 79 stops the program flow and shuts down said system 2. The program flow also includes in the END process step the shutdown actions of said system 2, i.e. closing said input valve 76A, turning off said heater 94 and said detergent dispenser 40 and opening said drain valve 76B. The END process step is intended to be redundant in most cases, but also insures that a shutdown due to the states of said proximity sensor 96 and said ph sensor 92 result in a safe and proper system shutdown.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A mat cleaning apparatus, said apparatus for cleaning a mat or screen and accepting water in a water stream from a pressurized water source, and said apparatus comprising:

an enclosure, said enclosure comprising a shell, a sump panel, a door, and an enclosure aperture, said sump panel attached to said shell and said door positionable against said shell, whereby a substantively water tight volume is established within said enclosure when said door is positioned substantively proximate to said shell;

said enclosure aperture for allowing the water stream from the pressurized water source into said enclosure, whereby said water stream passes into said enclosure;

said sump panel located beneath said shell, and said sump panel comprising a floor panel and a drain aperture, and said floor panel attached to said shell and said drain aperture located within said floor panel, whereby said water stream may drain downwards, out of and away from said enclosure through said drain aperture;

a mat frame, said mat frame located within said enclosure during a cleaning process and said mat frame comprising a top beam and a vertical member assembly whereupon said mat is placed upon said top beam;

said top beam positioned distal to said sump panel and substantively parallel to and above said side beams;

a water flow network, said water flow network comprising a water source end, a tubing assembly and at least one channel, said source end connected to the pressurized water source and passing through said enclosure aperture, said channel comprising at least a plurality of release slots, and said tubing assembly is connected to said water source end and at least one of said channels, whereby the water stream flows from the pressurized water source and into said enclosure aperture through said tubing and released substantively towards the mat; whereby the mat is placed onto the top beam, the pressurized water stream passes from the pressurized water source, through said water flow network and the mat is thereby irrigated and cleaned.

2. The apparatus of claim 1, said enclosure further comprising:

a recycling aperture and a recycling hose, said recycling hose comprising a hose length, a drain end and a tubing end;

said recycling end connected to said recycling aperture and accepting the water stream from within enclosure;

said hose length transporting the water from said recycling end to said tubing end; and said tubing end connected to said water flow network delivering the water stream into said water flow network, whereby the water passed at least once through the water flow network may be recycled through said mat apparatus.

3. The apparatus of claim 2, said recycling tube further comprising a pump, said pump increasing the degree of pressure placed upon the water contained within said recycling tube prior to the delivery of the water into said water flow network, whereby the water is more forcefully directed against the mat or the screen.

4. The apparatus of claim 3, said recycling tube further comprising a supply of detergent and a detergent dispenser, said detergent dispenser releasing a detergent into the water stream as the water stream passes through said recycling tube, whereby a water and detergent solution is delivered against the mat or screen and said detergent acts to clean the mat or screen.

5. The apparatus of claim 4, said apparatus further comprising a temperature and recycling control system, said ph control system comprising;

a master system controller;

a drainage point, said drainage point located within said apparatus, and said drainage point comprising an adjustable valve, said valve prohibiting or enabling the recycling of water through the apparatus by selectively opening and allowing the discharge of water from the apparatus;

a ph sensor, said ph sensor detecting an instantaneous ph of the water and emitting a corresponding ph measurement signal, and said ph sensor located within said apparatus;

an adjustable heating element, said heating element located within said apparatus and emitting heat into the water;

a temperature sensor, said temperature sensor detecting an instantaneous temperature of the water and emitting a corresponding temperature measurement signal, and said temperature sensor located within said apparatus; and a master signal network, said master signal network electrically connected to said master system controller, said ph sensor, said valve, said temperature sensor and said heating element, and said master signal network transmitting temperature measurement signals from said temperature sensor to said master system controller, and transmitting control signals from said master system controller to said heating element, whereby said master system controller adjusts the amount of heat emitted by said heating element in relation to the instantaneous temperature of the water and thereby causing the water within the enclosure to be maintained substantively consistently within a prespecified temperature range; and said master signal network transmitting said ph measurement signals from said ph sensor to said master system controller, and transmitting control signals from said master system controller to said valve, whereby said master system controller adjusts the rate of release of the water from said apparatus at said drainage point and in direct in relation to the instantaneous ph of the water and thereby causing the ph of the water within the enclosure to be maintained substantively consistently within a prespecified ph range and thereby controlling the level of contamination in the water within the enclosure.

6. The apparatus of claim 3, said apparatus further comprising a water recycling system, said water recycling system comprising;

a system controller;

a drainage point, said drainage point located within said apparatus, and said drainage point comprising an adjustable valve, said valve prohibiting or enabling the recycling of water through the apparatus by selectively opening and allowing the discharge of water from said apparatus;

a ph sensor, said ph sensor detecting an instantaneous ph of the water and emitting a corresponding ph measurement signal, and said ph sensor located within said apparatus;

a recycling signal network, said recycling signal network electrically connected to said system controller, said pump, said ph sensor and said valve, and said ph signal network transmitting said ph measurement signals from said ph sensor to said system controller, and transmitting control signals from said system controller to said valve, whereby said system controller adjusts the operation of said pump and the rate of release of the water from said apparatus at said drainage point and in direct in relation to the instantaneous ph of the water and thereby causing the ph of the water within the enclosure to be maintained substantively consistently within a prespecified ph range and thereby controlling the level of contamination in the water within the enclosure.

7. The apparatus of claim 3, said apparatus further comprising a temperature and recycling control system, said temperature control system comprising;

a master system controller;

a drainage point, said drainage point located within said apparatus, and said drainage point comprising an adjustable valve, said valve prohibiting or enabling the recycling of water through the apparatus by selectively opening and allowing the discharge of water from the apparatus;

a ph sensor, said ph sensor detecting an instantaneous ph of the water and emitting a corresponding ph measurement signal, and said ph sensor located within said apparatus;

an adjustable heating element, said heating element located within said apparatus and emitting heat into the water;

a temperature sensor, said temperature sensor detecting an instantaneous temperature of the water and emitting a corresponding temperature measurement signal, and said temperature sensor located within said apparatus; and a master signal network, said master signal network electrically connected to said master system controller, said ph sensor, said valve, said temperature sensor and said heating element, and said master signal network transmitting temperature measurement signals from said temperature sensor to said master system controller, and transmitting control signals from said master system controller to said heating element, whereby said master system controller adjusts the amount of heat emitted by said heating element in relation to the instantaneous temperature of the water and thereby causing the water within the enclosure to be maintained substantively consistently within a prespecified temperature range; and said master signal network transmitting said ph measurement signals from said ph sensor to said master system controller, and transmitting control signals from said master system controller to said valve, whereby said master system controller adjusts the rate of release of the water from said apparatus at said drainage point and in direct in relation to the instantaneous ph of the water and thereby causing the ph of the water within the enclosure to be maintained substantively consistently within a prespecified ph range and thereby controlling the level of contamination in the water within the enclosure.

8. The apparatus of claim 2, said recycling tube further comprising a supply of detergent and a detergent dispenser, said detergent dispenser releasing a detergent into the water stream as the water stream passes through said recycling tube, whereby a water and detergent solution is delivered against the mat or screen and said detergent acts to clean the mat or screen.

9. The apparatus of claim 1, said apparatus further comprising a temperature control system, said temperature control system comprising;

a controller;

an adjustable heating element, said heating element located within said apparatus and emitting heat into the water;

a temperature sensor, said temperature sensor detecting an instantaneous temperature of the water and emitting a corresponding temperature measurement signal, and said temperature sensor located within said apparatus;

a power network, said power network comprising an electrical power source and delivering electrical power to said controller, said heating element and said temperature sensor; and an electrical signal network, said signal network electrically connected to said controller, said temperature sensor and said heating element, and said signal network transmitting temperature measurement signals from said temperature sensor to said controller, and transmitting control signals from said controller to said heating element, whereby said controller adjusts the amount of heat emitted by said heating element in relation to the instantaneous temperature of the water and thereby causing the water within the enclosure to be maintained substantively consistently within a prespecified temperature range.

10. A mat and screen cleaning apparatus, said apparatus for cleaning a mat or screen and accepting water from a pressurized water source, and said apparatus comprising:

an enclosure, said enclosure comprising a shell, a sump panel, a door, and an enclosure aperture, said sump panel attached to said shell and said door hingeably attached to said shell, whereby a substantively water tight volume is established within said enclosure when said door is positioned substantively closed and proximal to said shell;

said enclosure aperture for allowing water from the pressurized water source into said enclosure, whereby water is transported into said enclosure;

said sump panel located beneath said shell, and said sump panel comprising a floor panel and a drain aperture, and said floor panel attached to said shell and said drain aperture located within said floor panel, whereby fluid may drain downwards, out of and away from said enclosure via said drain aperture;

a mat frame, said mat frame slideably attached to said enclosure, and said mat frame comprising a forming length, a top beam and at least two side beams, where said top and said side beams are substantively equivalent in length and are attached to said forming length, and whereby said frame may be slid in and out of said enclosure when said door is positioned substantively open, whereby an increased ease of placing the mat upon said frame is achieved;

said top beam positioned distal to said sump panel and substantively parallel to and above said side beams;

said side beams positioned below and substantively parallel to said top beam, and at least two of said side beams spaced substantively apart from and on opposite sides of said top beam;

a water tube, said water tube comprising a hollow tube, a source end and an enclosure end, said source end connected to the pressurized water source and said enclosure end connected to said enclosure, whereby water is transported from the pressurized water source and through said enclosure aperture via said water tube;

a water delivery network, said network affixed to said enclosure, and said network comprising a feeding tube assembly, at least two outer channels and at least one inner channel;

said feeding tube assembly connected to said water tube, and at least two outer channels and at least one inner channel, and said assembly receiving water from the pressurized water source and via said water tube;

said inner channel positioned substantively parallel to and substantively directly beneath said top beam, and said inner channel comprising a plurality of jet ports whereby the water is released under pressure from said inner channel and within the enclosure; and said outer channels positioned below and substantively apart from and parallel to said top beam, and at least two of said outer channels positioned on opposite sides of said top beam and outside of said side beams, and said outer channels each comprising a plurality of jet ports whereby the water is released under pressure from each of said outer channels and within the enclosure, whereby the mat or screen is placed onto the top beam and about the side beams, said door is hingeably closed, pressurized water is released against the mat and from said inner and outer channels and the mat or screen is thereby irrigated and cleaned.

11. The apparatus of claim 10, said mat frame further comprising at least one wheel, said wheel located on said forming length and beneath said top beam and said side beams, whereby said wheel partially bears the weight of said mat frame and thereby increases the ease of movement of said mat frame.

12. The apparatus of claim 11, said water tube further comprising a pump, said pump increasing the degree of pressure placed upon the water prior to the delivery of the water into said enclosure, whereby water is more forcefully directed against said mat.

13. The apparatus of claim 12, said apparatus further comprising a temperature and water recycling control system, said temperature and water recycling control system comprising;

a master system controller;

a drainage point, said drainage point located within said apparatus, and said drainage point comprising an adjustable valve, said valve prohibiting or enabling the recycling of water through the apparatus by selectively opening and allowing the discharge of water from the apparatus;

a ph sensor, said ph sensor detecting an instantaneous ph of the water and emitting a corresponding ph measurement signal, and said ph sensor located within said apparatus;

an adjustable heating element, said heating element located within said apparatus and emitting heat into the water;

a temperature sensor, said temperature sensor detecting an instantaneous temperature of the water and emitting a corresponding temperature measurement signal, and said temperature sensor located within said apparatus; and a master signal network, said master signal network electrically connected to said master system controller, said ph sensor, said valve, said temperature sensor and said heating element, and said master signal network transmitting temperature measurement signals from said temperature sensor to said master system controller, and transmitting control signals from said master system controller to said heating element, whereby said master system controller adjusts the amount of heat emitted by said heating element in relation to the instantaneous temperature of the water and thereby causing the water within the enclosure to be maintained substantively consistently within a prespecified temperature range; and said master signal network transmitting said ph measurement signals from said ph sensor to said master system controller, and transmitting control signals from said master system controller to said valve, whereby said master system controller adjusts the rate of release of the water from said apparatus at said drainage point and in direct in relation to the instantaneous ph of the water and thereby causing the ph of the water within the enclosure to be maintained substantively consistently within a prespecified ph range and thereby controlling the level of contamination in the water within the enclosure.

14. The apparatus of claim 11, said water tube further comprising a detergent dispenser, said detergent dispenser releasing a solvent into the water as the water passes through said water tube, whereby a water and solvent mixture is delivered against the mat and the solvent acts to clean the mat.

15. The apparatus of claim 10, said sump panel further comprising:

a recycling hose, said recycling hose comprising a hose length, a drain end and a water tube end;

said drain end connected to said drain aperture and accepting the water from within said enclosure;

said hose length transporting the water from said drain end to said water tube end; and said water tube end connected to said water tube and delivering the water into said water tube, whereby water passed at least once through the enclosure may be recycled.

16. The apparatus of claim 15, said water tube further comprising a pump, said pump increasing the degree of pressure placed upon the water prior to the delivery of the water into said enclosure, whereby water is more forcefully directed against said mat.

17. The apparatus of claim 16, said water tube further comprising a detergent dispenser, said detergent dispenser releasing a solvent into the water as the water passes through said water tube, whereby a water and solvent mixture is delivered against the mat and the solvent acts to clean the mat.

18. The apparatus of claim 15, said apparatus further comprising a water recycling system, said water recycling system comprising;

a system controller;

a drainage point, said drainage point located within said apparatus, and said drainage point comprising an adjustable valve, said valve prohibiting or enabling the recycling of water through the apparatus by selectively opening and allowing the discharge of water from the apparatus;

a ph sensor, said ph sensor detecting an instantaneous ph of the water and emitting a corresponding ph measurement signal, and said ph sensor located within said apparatus;

a recycling signal network, said recycling signal network electrically connected to said system controller, said ph sensor and said valve, and said ph signal network transmitting said ph measurement signals from said ph sensor to said system controller, and transmitting control signals from said system controller to said valve, whereby said system controller adjusts the rate of release of the water from said apparatus at said drainage point and in direct in relation to the instantaneous ph of the water and thereby causing the ph of the water within the enclosure to be maintained substantively consistently within a prespecified ph range and thereby controlling the level of contamination in the water within the enclosure.

19. The apparatus of claim 10, said apparatus further comprising a temperature control system, said temperature control system comprising;

an electrical controller;

an adjustable heating element, said heating element located within said apparatus and emitting heat into the water;

a temperature sensor, said temperature sensor detecting an instantaneous temperature of the water and emitting a corresponding temperature measurement signal, and said temperature sensor located within said apparatus; and a signal network, said signal network electrically connected to said controller, said temperature sensor and said heating element, and said signal network transmitting temperature measurement signals from said temperature sensor to said controller, and transmitting control signals from said controller to said heating element, whereby said controller adjusts the amount of heat emitted by said heating element in relation to the instantaneous temperature of the water and thereby causing the water within the enclosure to be maintained substantively consistently within a prespecified temperature range.

* * * * *